United States Patent
Baldwin et al.

(10) Patent No.: US 7,003,782 B2
(45) Date of Patent: Feb. 21, 2006

(54) OPTIMIZED COBRA SOFTWARE METHOD INVOCATION

(75) Inventors: Timothy John Baldwin, Swanmore (GB); Ann Eleanor Dalton, Botley (GB); Simon Christopher Nash, Stockbridge (GB)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 10/286,001

(22) Filed: Oct. 31, 2002

(65) Prior Publication Data

US 2004/0064823 A1    Apr. 1, 2004

(30) Foreign Application Priority Data

Sep. 27, 2002  (GB) .................................... 0222420

(51) Int. Cl.
*G06F 9/44* (2006.01)
(52) U.S. Cl. ...................... 719/330; 719/316; 717/166; 709/201
(58) Field of Classification Search ................ 719/315, 719/316, 330, 331, 310, 332; 709/201–203; 717/162–167
See application file for complete search history.

(56) References Cited

U.S. PATENT DOCUMENTS

| 5,732,270 | A | * | 3/1998 | Foody et al. ............... 719/316 |
| 5,805,858 | A | * | 9/1998 | Kumamoto et al. ........... 703/1 |
| 6,016,514 | A | * | 1/2000 | Cink et al. .................. 719/315 |
| 6,182,154 | B1 | * | 1/2001 | Campagnoni et al. ...... 719/315 |
| 6,260,078 | B1 | * | 7/2001 | Fowlow ....................... 719/332 |
| 6,385,661 | B1 | * | 5/2002 | Guthrie et al. .............. 719/316 |
| 6,629,128 | B1 | * | 9/2003 | Glass .......................... 709/203 |
| 6,951,021 | B1 | * | 9/2005 | Bodwell et al. ............. 719/316 |

OTHER PUBLICATIONS

WebLogic RMI Features and Guidelines, pp 1-7.
How does the Borland AppServer, specifically the EJB Container, load classes? pp 1-2.
Java ™ Language to IDL Mapping, pp 1-1 to 1-68.

* cited by examiner

*Primary Examiner*—W. Thomson
*Assistant Examiner*—George L. Opie
(74) *Attorney, Agent, or Firm*—Leslie A. VanLeeuwen

(57) ABSTRACT

A method for calling a software method in a called CORBA application by a caller software method in a caller CORBA application in a process of a computer system is disclosed. The caller software method calls a software method in a CORBA stub sending a parameter which is created using a classloader of the caller application. The CORBA stub software method calls a software method in a dynamic proxy sending the parameter. The dynamic proxy software method calls an ORB sending the parameter. The ORB serializes the parameter and returns it to the dynamic proxy software method. The dynamic proxy software method calls the ORB sending the serialized parameter. The ORB deserializes the serialized parameter using a classloader of the called application and returns it to the dynamic proxy software method. The dynamic proxy software method calls the called software method sending the deserialized parameter. Alternatively, instead of the ORB serializing and deserializing the parameter object, the ORB creates a copy of the parameter object using the classloader of the called application.

6 Claims, 6 Drawing Sheets

PRIOR ART

OPTIMIZED COBRA SOFTWARE METHOD INVOCATION

FIELD OF THE INVENTION

This invention relates to the invocation of software methods in an implementation of the Common Object Request Broker Architecture (CORBA) specification. In particular it relates to invocation calls between software methods in different applications within a single process on a computer system.

BACKGROUND OF THE INVENTION

In object oriented software, applications are characterized by one or more software objects and run in a process on a computer system. A software object, referred to as an object, is an instance of a software class represented as an encapsulated software component comprising data attributes and functionality. A process is comprised of one or more execution units within a computer system, with an execution unit being a single stream of executable instructions executed sequentially by a central processing unit (CPU) of the computer system. The functionality within a software class is defined by software methods which are executed at run-time. Software classes are developed to represent abstract components of an object oriented software application. Instances of software classes are created during application run-time as objects in an application. An example of an object oriented programming language and execution environment is Java 2 Standard Edition (J2SE) (a trademark of Sun Microsystems, Inc.), and an example of an execution unit which runs in a process is a Java thread and is well known in the art.

In order to create a new object as an instance of a class, an application needs to obtain a definition of the class. Class definitions are typically stored within a data store in a computer system such as a hard disk drive. The application loads the class definition from the data store using a software routine called a classloader. Each software application has at least one classloader, and different software applications may have different classloaders. The class, once loaded, is also used to access instances of the class originating outside the application, such as objects passed from other applications as parameter objects. The class is uniquely referenced by the application using a combination of a name of the class and a reference to a classloader which loaded the class. Only a class with the correct unique reference can be used by the application to access a software object instance of that class. A software object is accessible to an application if the application can access data attributes of the software object and invoke software methods of the object. In Java, for example, if a first Java application sends a parameter object to a second Java application, and the Java applications use different classloaders, the parameter object cannot be accessed by the second Java application.

The Common Object Request Broker Architecture (CORBA) (a registered trademark of the Object Management Group, Inc) is a specification defined by the Object Management Group (OMG) (OMG is a trademark of the Object Management Group, Inc.) for the interoperation of objects in object oriented applications. Using a CORBA implementation software methods of a caller object can invoke software methods of a called object. As part of this method invocation call, the caller object can send one or more objects as parameters to the called object. A parameter object is an object sent between software methods, for example an argument for a software method, a return value from a software method or an indication of a state sent by a software method (known as an exception) all of which are well known in the art. The caller and called objects can exist in different configurations within a computer system or in a network of computer systems. In one configuration, the caller object exists in an application running within a process on a local computer system and the called object exists in a second application running within a process on a different, remote computer system. This configuration shall hereinafter be referred to as a remote configuration. In an alternative configuration, the caller and called objects exist in separate applications running within a single process on the same local computer system. This alternative configuration shall hereinafter be referred to as a local configuration. Many further configurations are conceivable, each with a different organization of the caller and called objects in a computer system or in a network of computer systems.

The CORBA specification requires that an invocation of a software method in a called object by a software method in a caller object can take place regardless of the configuration of the caller and called objects. The CORBA specification further requires that the effect of a software method invocation for a specific configuration of a caller and a called object is the same as the effect of the same software method invocation in any other configuration of the caller and called objects (known as semantic equivalence). An implementation of the CORBA specification therefore allows software objects to inter-operate across heterogeneous computer systems in the same way regardless of the configuration.

Figure 1A:
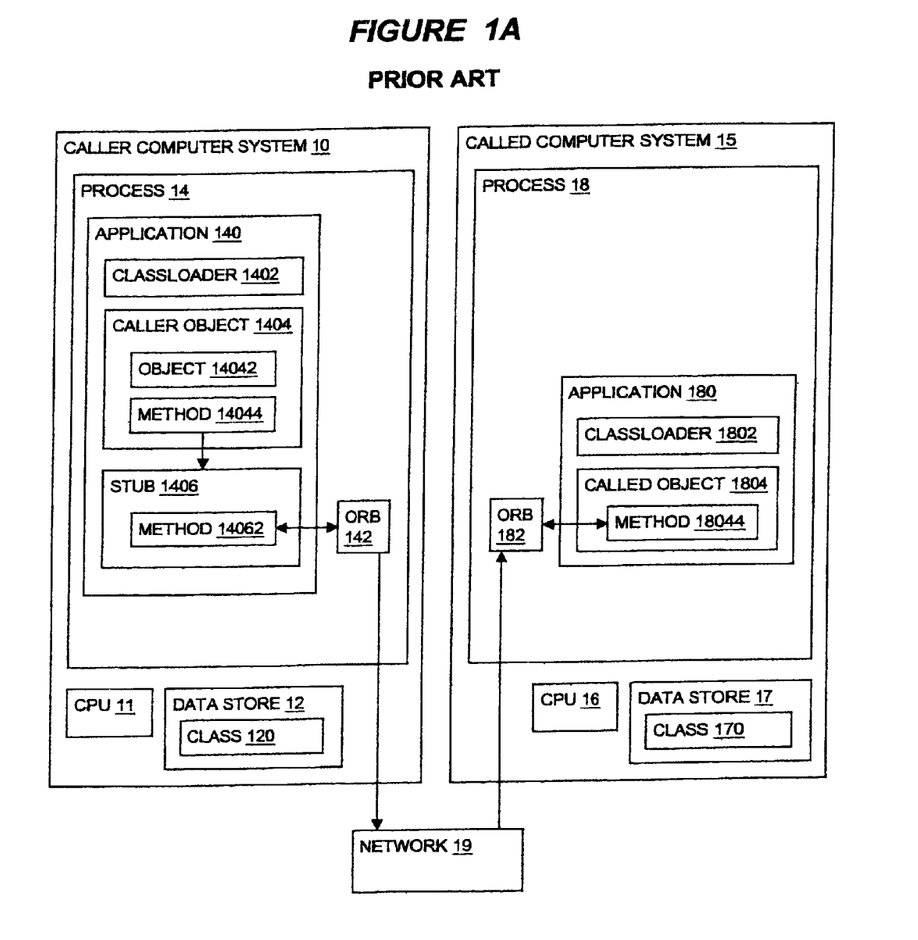
FIG. 1A is a schematic diagram illustrating a prior art arrangement of two computer systems each running a process.

FIG. 1A is a schematic diagram illustrating a prior art arrangement of two computer systems each running a process. A description of a first technique for invoking a software method in a called object using a CORBA implementation where a caller and the called objects exist in a remote configuration is provided below with reference to FIG. 1A. Caller computer system 10 includes a central processing unit (CPU) 11, a data store 12 and a process 14. Data store 12 is a non-volatile data storage medium such as a hard disk drive. An object oriented class 120 is stored in binary format in data store 12. Class 120 is used to create software objects as instances of class 120 in an object oriented application 140. A process 14 executes in caller computer system 10. For example, process 14 is a Java Virtual Machine (JVM) and class 120 is a Java class.

Process 14 includes an application 140 in binary form. Application 140 is an object oriented application and includes a classloader 1402, a caller object 1404 and a stub 1406. Classloader 1402 is a software routine executable by the CPU 11. In use, classloader 1402 loads a software class from data store 12 when application 140 creates a new software object. For example, classloader 1402 is a Java classloader. Caller object 1404 is a software object and includes object 14042 as an attribute and executable software method 14044. Object 14042 is an instance of a class loaded by classloader 1402. Stub 1406 is a software object comprising an executable software method 14062. For example, application 140 is a Java application.

Process 14 further includes an object request broker (ORB) 142. ORB 142 is an implementation of the CORBA specification and is comprised of software routines executable by the CPU 11, including routines to serialize and deserialize a software object and invoke a software method. Serializing a software object involves converting the software object into a serial stream of bytes such that it can be transmitted over a computer network or stored on a data storage medium. Deserializing a software object involves converting a serial stream of bytes into a software object within a computer system such that it can be used by an object oriented application.

Called computer system 15 includes a CPU 16, a data store 17 and a process 18 which are identical to those elements described with respect to the caller computer system 10. Process 18 includes an application 180 in binary form. Application 180 is an object oriented application and includes a classloader 1802 and a called object 1804. Classloader 1802 is a software routine executable by the CPU 16. In use, classloader 1802 loads a software class from data store 17 when application 180 creates a new software object. For example, classloader 1802 is a Java classloader. Called object 1804 is a software object and includes an executable software method 18044. For example, application 180 is a Java application. Called computer system 15 further includes an ORB 182 which is identical to the ORB 142 of caller computer system 10.

Caller computer system 10 is connected to called computer system 15 by a computer network 19 using a network protocol. For example, computer network 19 is the internet and the network protocol is the Transmission Control Protocol Internet Protocol (TCP/IP). Stub 1406 of application 140 is a CORBA stub for called object 1804 of application 180, and software method 14062 of stub 1406 is an entry point to software method 18044 from within application 140.

A method to invoke the software method 18044 on the called computer system 15 by software method 14044 on the caller computer system 10 will now be described. Software method 14044 invokes software method 14062 of the stub 1406. Object 14042 is sent as a parameter of the software method invocation and is an instance of class 120 loaded by classloader 1402. Software method 14062 passes parameter object 14042 to ORB 142. ORB 142 subsequently serializes parameter object 14042 and invokes software method 18044 of the called computer system 15 sending parameter object 14042 in serialized form over computer network 19. ORB 182 deserializes parameter object 14042 by creating parameter object 14042 as an instance of class 170 on called computer system 15 using classloader 1802 to load class 170 from data store 17. A copy of parameter object 14042 is therefore created in the called application 180. ORB 182 subsequently invokes software method 18044 sending the copy of parameter object 14042.

The first technique described above may also be used in a local configuration where the caller and called objects 1404 and 1804 exist in different applications running in the same process on a single computer system. In this configuration a single ORB in the computer system sends the method invocation and parameter object 14042 to itself over the computer network 19, because a single computer system is both the caller and called computer system in a local configuration. Computer network 19 and the associated network protocol may provide an optimization to remove the need for the method invocation and parameter object 14042 to be sent over the computer network 19. For example, in the TCP/IP protocol, a loopback feature is employed to provide a simple network connection within a single computer system where data never leaves the computer system, and is well known in the art. This provides the required network services including sending and receiving network messages and data within a single local computer system. However, where both the caller and called objects 1404 and 1804 exist on the same computer system the use of a computer network 19 to communicate between then is an unnecessary overhead, as a computer network is not required to send data between the objects.

Figure 1B:
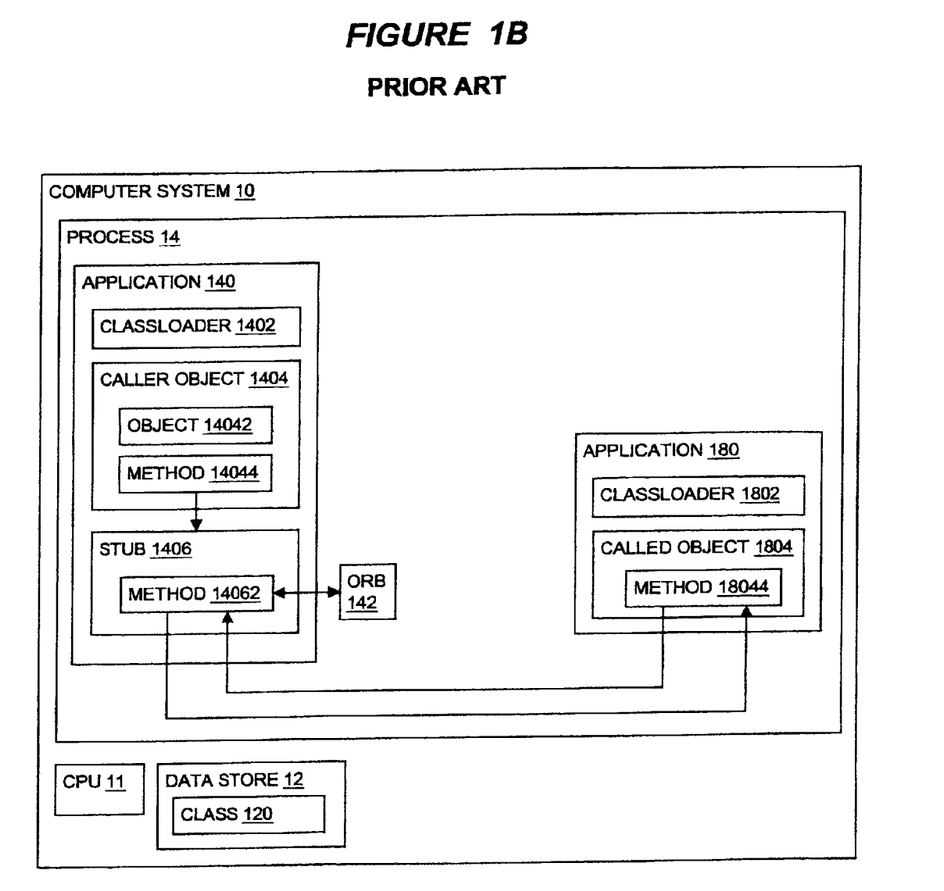
FIG. 1B is a schematic diagram illustrating a prior art arrangement of a computer system running a process.

FIG. 1B is a schematic diagram illustrating a prior art arrangement of a computer system running a process. A description of a technique for invoking a software method in a called object using a CORBA implementation where a caller and the called objects exist in a local configuration is provided below. This technique is known in the art (see "Java to IDL Language Mapping" from the Object Management Group (OMG) available on the web at cgi.omg.org/cgi-bin/doc?ptc/02-06-08.pdf, and "How does the Borland AppServer, Specifically the EJB Container, load classes?" from the Borland Software Corporation available on the Web at info.borland.com/devsupport/Appserver/faq/45/ejb/ejbconta iner-load-classes.html). All of the elements of computer system 10 of FIG. 1B are identical to those described with respect to FIG. 1A but in a local configuration. A description of the elements of FIG. 1B will not be repeated here.

Referring to FIG. 1B, a method to invoke the software method 18044 by software method 14044 will now be described. Software method 14044 invokes software method 14062 of the stub 1406. Object 14042 is sent as a parameter of the software method invocation and is an instance of class 120 loaded by classloader 1402. Stub method 14062 queries ORB 142 to determine if the called object 1804 is in the same process as the caller object 1404. If ORB 142 indicates that the caller and called objects 1404 and 1804 are in the same process, the stub software method 14062 creates a copy of parameter object 14042 by creating a new instance of class 120 using classloader 1402 with the same attributes as parameter object 14042. Subsequently software method 14062 directly invokes software method 18044, sending the copy of object 14042 as a parameter. This direct invocation without the use of a computer network is possible because both the caller object 1404 and the called object 1804 exist in the same process. Software method 18044 executes in the CPU 11.

Applications 140 and 180 have different classloaders 1402 and 1802 respectively, therefore objects created by application 140 are inaccessible to application 180, creating a significant limitation on application developers.

SUMMARY OF THE INVENTION

Accordingly the present invention provides a method for calling a software method in a called application by a caller software method in a caller application, where the caller and called applications are CORBA applications in a process of a computer system is disclosed. In accordance with the method of the present invention, the caller software method calls a software method in a CORBA stub object sending a parameter object which is created using a classloader of the caller application. The CORBA stub software method calls a software method in a dynamic proxy sending the parameter object. The dynamic proxy software method calls an object request broker (ORB) sending the parameter object. ORB serializes the parameter object and returns it to the dynamic proxy software method. The dynamic proxy software method calls the ORB sending the serialized parameter object. The ORB deserializes the serialized parameter object using a classloader of the called application and returns it to the dynamic proxy software method. The dynamic proxy software method calls the called software method sending the deserialized parameter object.

The present invention allows an optimized software method invocation of a called software method by a caller software method where both the caller and called software methods exist in different applications in a single process on a computer system without the use of a network protocol. The ORB deserializes the parameter object using the classloader of the called application, therefore allowing the called software method to be able to access the parameter object even though the classloaders of the called object is different to the classloader of the caller object.

Further, the invention provides an apparatus for carrying out the method described above as well as a computer program product comprising computer program code stored on a computer readable storage medium which, when executed on a data processing system, instructs the data processing system to carry out the method as described above.

According to a second aspect of the present invention there is provided a a method for calling a software method in a called application by a caller software method in a caller application, where the caller and called applications are CORBA applications in a process of a computer system is disclosed. In accordance with the method of the second aspect of the present invention, the caller software method calls a software method in a CORBA stub object sending a parameter object which is created using a classloader of the caller application. The CORBA stub software method calls a software method in a dynamic proxy sending the parameter object. The dynamic proxy software method calls an ORB sending the parameter object. The ORB creates a copy of the parameter object using a classloader of the called application and returning the copy of the parameter object to the dynamic proxy software method. The dynamic proxy software method calls the called software method sending the copy of the parameter object.

Further, the invention provides an apparatus for carrying out the method described in the second aspect above as well as a computer program product comprising computer program code stored on a computer readable storage medium which, when executed on a data processing system, instructs the data processing system to carry out the method as described in the second aspect above.

DETAILED DESCRIPTION OF THE PREFERRED EMBODIMENTS

Figure 2:
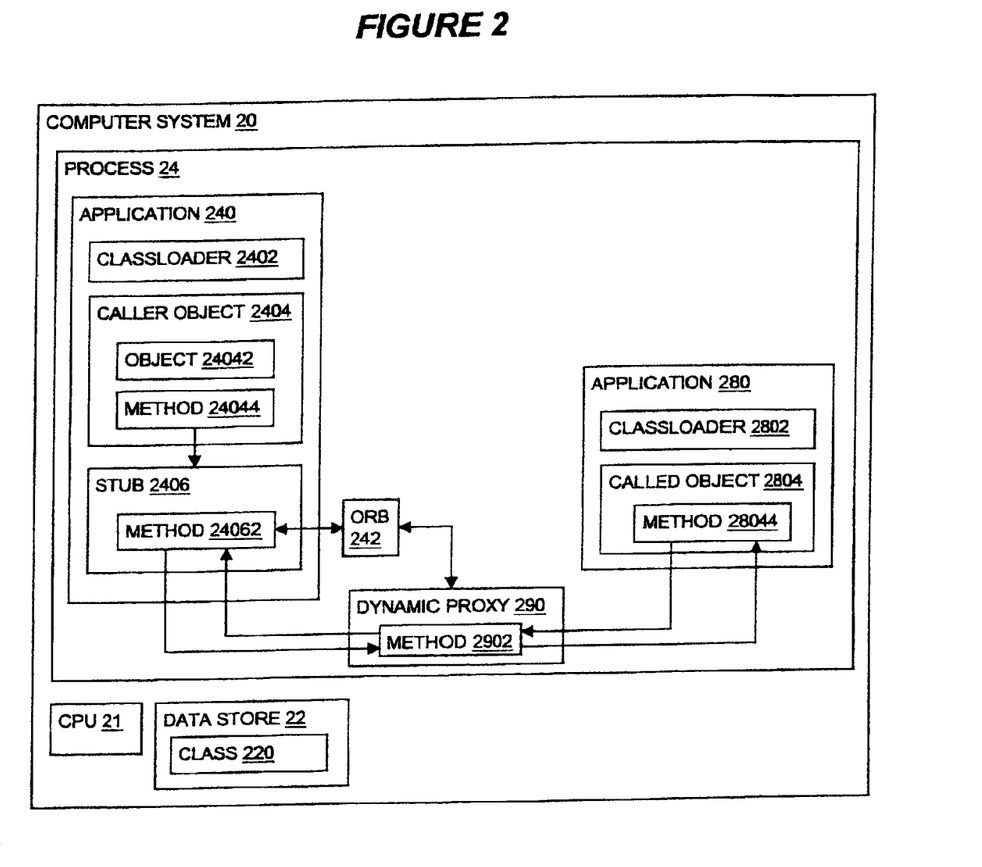
FIG. 2 is a schematic diagram illustrating an arrangement of a computer system running a process according to a preferred embodiment of the present invention.

FIG. 2 is a schematic diagram illustrating an arrangement of a computer system running a process in a preferred embodiment of the present invention. Many elements of the computer system are identical to those described with respect to FIG. 1B and these will not be repeated here in the description of FIG. 2.

In addition to the elements described with respect to FIG. 1B, process 24 includes a dynamic proxy 290. Dynamic proxy 290 is an object including a software method 2902 which is automatically invoked when a call is made to software method 28044. Dynamic proxy 290 further receives parameter objects sent by a caller object. In the preferred embodiment, dynamic proxy 290 is a Java Dynamic proxy as is well known in the art.

Figure 3:
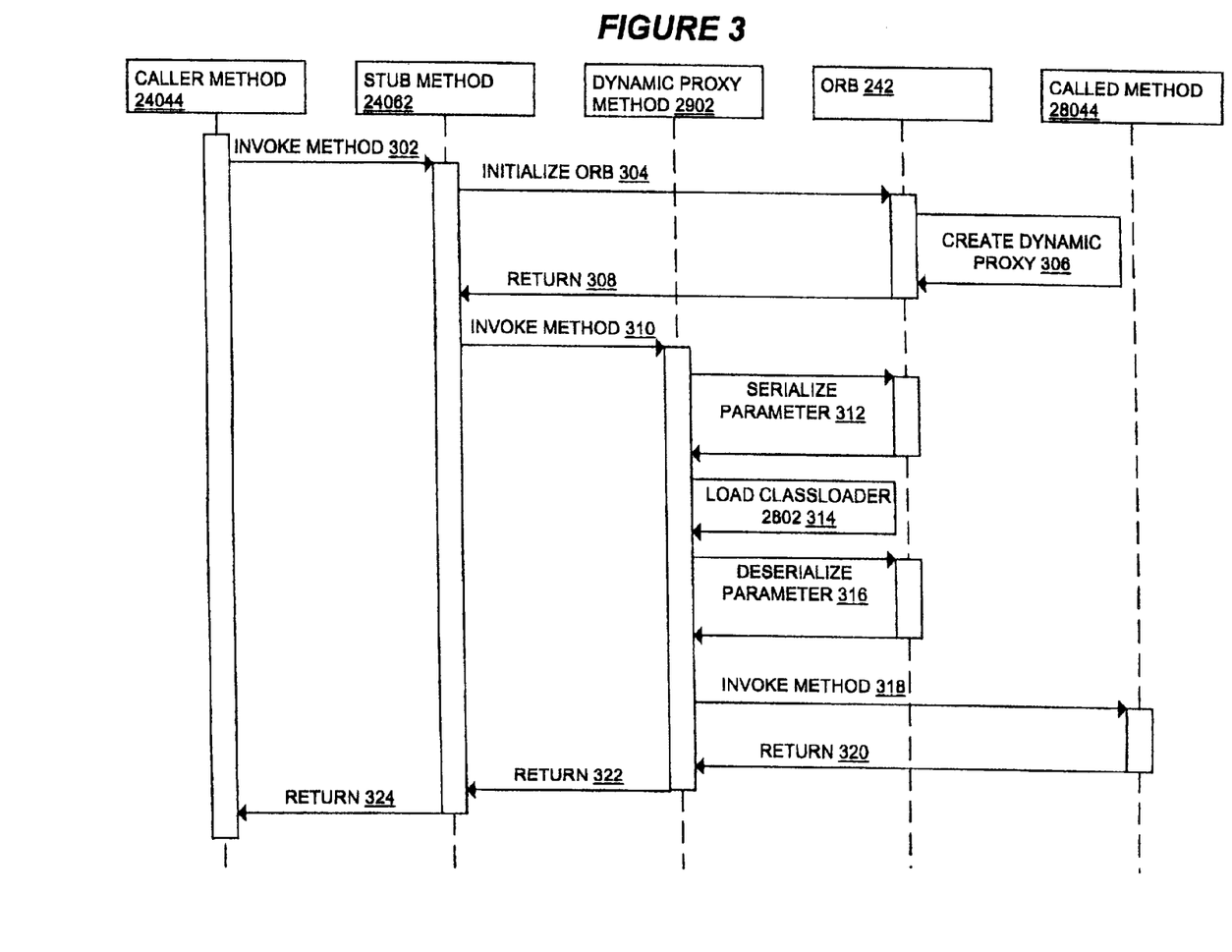
FIG. 3 is a sequence diagram illustrating a method for calling the called software method 28044 by the caller software method 24044 of FIG. 2 in accordance with the preferred embodiment of the present invention.

FIG. 3 is a sequence diagram illustrating a method for calling the called software method 28044 by the caller software method 24044 of FIG. 2 in accordance with the preferred embodiment of the present invention. At step 302, caller software method 24044 invokes stub software method 24062 sending object 24042 as a parameter object. At step 304, stub software method 24062 sends an initialization message to ORB 242. At step 306, ORB 242 determines that the caller and called software methods 24044 and 28044 exist in different applications within the same process on computer system 20 and creates dynamic proxy 290 for called software method 28044. Subsequently, at step 308, ORB 242 returns to stub software method 24062.

At step 310, stub software method 24062 invokes dynamic proxy software method 2902 sending object 24042 as a parameter. At step 312, dynamic proxy software method 2902 sends parameter object 24042 to ORB 242 which serializes object 24042 by converting object 24042 into a serial stream of bytes. ORB 242 subsequently returns object 24042 in serialized form to the dynamic proxy software method 2902. At step 314, dynamic proxy 290 loads the classloader 2802 of the called application 280. At step 316 the dynamic proxy software method 2902 sends object 24042 in serialized form to ORB 242 which deserializes object 24042 by converting object 24042 from a serial stream of bytes to a software object 24042 using classloader 2802. Subsequently, ORB 242 returns object 24042 loaded with classloader 2802 to the dynamic proxy software method 2902. At step 318 the dynamic proxy software method 2902 invokes called software method 28044 sending object 24042 loaded with classloader 2802 as a parameter object. Called software method 28044 executes in CPU 21. On completion of execution called software method 28044 returns to the dynamic proxy software method 2902 at step 320. At step 322 the dynamic proxy software method 2902 returns to the stub software method 24062, which subsequently returns to caller software method 24044 at step 324.

In the sequence diagram of FIG. 3, classloader 2802 is used by ORB 242 to convert a serial stream of bytes representing software object 24042 into software object 24042 at step 316. This allows the dynamic proxy software method 2902 to invoke called software method 28044 sending object 24042 loaded with classloader 2802 as a parameter. During execution, called software method 28044 is able to access object 24042 loaded with classloader 2802 because called software method 28044 is able to load class 220 using classloader 2802. Using the method illustrated in FIG. 3 an efficient direct call between caller software method 24044 and called software method 28044 sending parameter object 24042 is possible. Furthermore, called software method 28044 is able to access parameter object 24042 which originates from a different application 240 with a different classloader 2402, as it would be able to in an un-optimized method employing a network protocol as shown in FIG. 1A.

In an alternative embodiment steps 312 and 316 of FIG. 3 are omitted, and after step 314 the dynamic proxy software method 2902 sends parameter object 24042 to ORB 242 which creates a copy of the parameter object 24042 using classloader 2802 of the called application 280. ORB 242 subsequently returns the copy of object 24042 to the dynamic proxy software method 2902. In this alternative embodiment, a copy of parameter object 24042 is created by instantiating a new instance of class 220 using classloader 2802 with all attributes of the new instance of class 220 assigned values such that the new instance is identical to parameter object 24042 but loaded using classloader 2802. Because the copy of parameter object 24042 is loaded with classloader 2802, called software method 28044 is able to access the copy of parameter object 24042.

Figure 4:
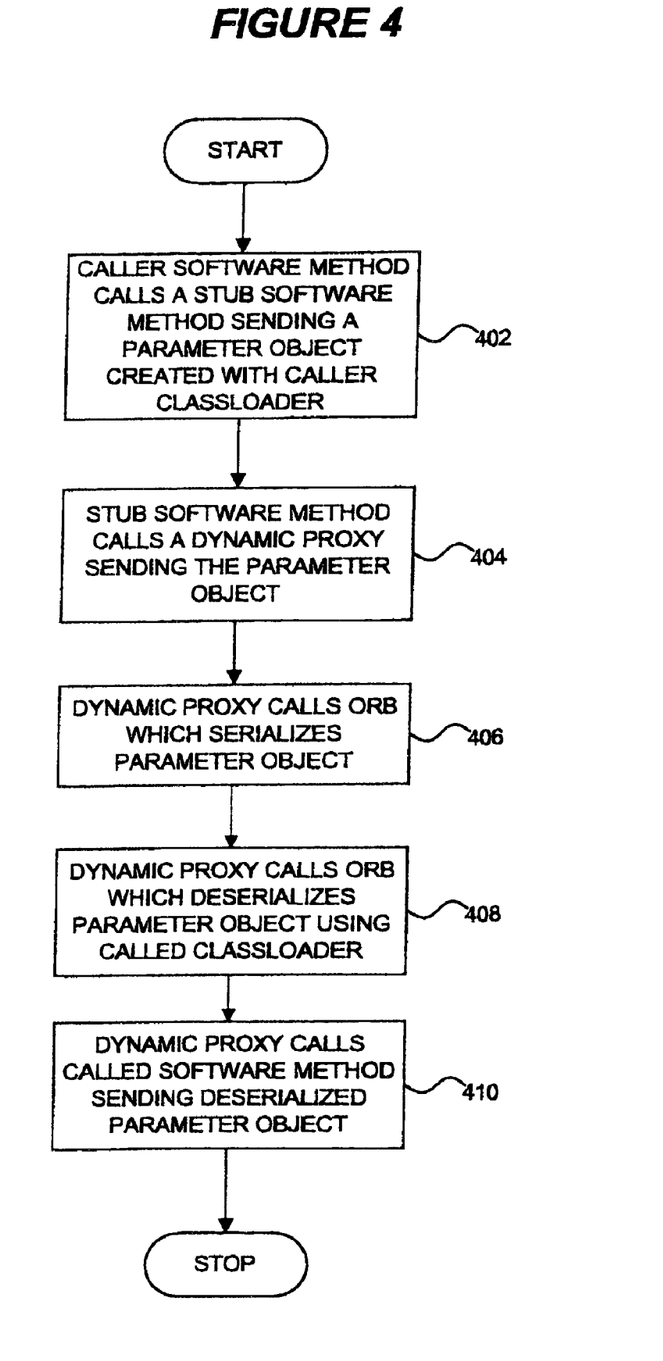
FIG. 4 is a flow diagram illustrating the method of FIG. 3 in accordance with the preferred embodiment of the present invention.

FIG. 4 is a flow diagram illustrating the method of FIG. 3 in accordance with the preferred embodiment of the present invention. At step 402, the caller software method 24044 calls the stub software method 24062 sending software object 24042 as a parameter. Software object 24042 is created using the classloader 2402 of application 240. At step 404 the stub software method 24062 calls the dynamic proxy software method 2902 sending software object 24042 as a parameter. At step 406 the dynamic proxy software method 2902 sends the parameter object 24042 to the ORB 242 which serializes the parameter object 24042 by converting parameter object 24042 into a serial stream of bytes. The ORB 242 subsequently returns the serialized parameter object 24042 to the dynamic proxy software method 2902. At step 408 the dynamic proxy software method 2902 sends the parameter object 24042 to the ORB 242 which deserializes the serialized parameter object 24042 by converting the serial stream of bytes representing parameter object 24042 to a software object using classloader 2802. The ORB 242 subsequently returns the deserialized parameter object 24042 to the dynamic proxy software method 2902. At step 410 the dynamic proxy software method 2902 calls the called software method 28044 sending the deserialized parameter object 24042. Subsequently, called software method 28044 is able to access deserialized software object 24042 because it was loaded with the classloader 2802 of application 280.

Figure 5:
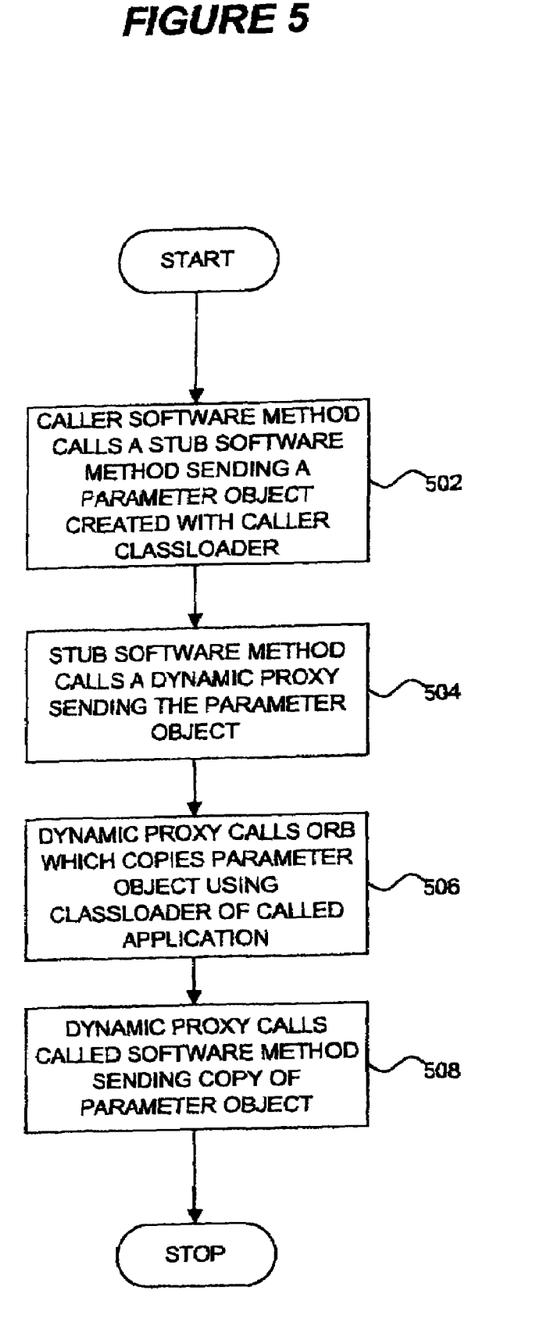
FIG. 5 is a flow diagram illustrating a method for calling the called software method 28044 by the caller software method 24044 of FIG. 2 according to an alternative embodiment of the present invention.

FIG. 5 is a flow diagram illustrating a method for calling the called software method 28044 by the caller software method 24044 of FIG. 2 according to an alternative embodiment of the present invention. At step 502, the caller software method 24044 calls the stub software method 24062 sending software object 24042 as a parameter. Software object 24042 is created using the classloader 2402 of application 240. At step 504 the stub software method 24062 calls the dynamic proxy software method 2902 sending software object 24042 as a parameter. At step 506 the dynamic proxy software method 2902 calls the ORB 242 sending parameter object 24042 which creates a copy of the parameter object 24042 using classloader 2802 of the called application 280. The copy of parameter object 24042 is identical to object 24042 except that it is created using classloader 2802. The ORB 242 subsequently returns the copy of parameter object 24042 to the dynamic proxy software method 2902. At step 508 the dynamic proxy software method 2902 calls the called software method 28044 sending the copy of parameter object 24042. Subsequently, called software method 28044 is able to access the copy of parameter object 24042 because it was loaded with the classloader 2802 of application 280.

The invention claimed is:

1. A method for calling a software method of a called application by a caller software method of a caller application, where said caller and called applications are CORBA applications in a process of a computer system, the method comprising the steps of:

said caller software method calling a software method in a CORBA stub object sending a parameter object, said parameter object being created using a classloader of said caller application;

said software method in the CORBA stub object calling a software method in a dynamic proxy sending said parameter object;

said software method in the dynamic proxy calling an object request broker (ORB) sending said parameter object;

said ORB serializing said parameter object to generate a serialized parameter object and returning said serialized parameter object to said software method in the dynamic proxy;

said software method in the dynamic proxy calling the ORB sending said serialized parameter object;

said ORB deserializing said serialized parameter object using a classloader of said called application generating a deserialized parameter object and returning said deserialized parameter object to said software method in the dynamic proxy; and said software method in the dynamic proxy calling said called software method sending said deserialized parameter object.

2. A computer program product comprising computer program code stored on a computer readable storage medium which, when executed on a data processing system, instructs the data processing system to carry out the method as claimed in claim 1.

3. A method for calling a software method of a called application by a caller software method of a caller application, where said caller and called applications are CORBA applications in a process of a computer system, the method comprising the steps of:

said caller software method calling a software method in a CORBA stub object sending a parameter object, said parameter object being created using a classloader of said caller application;

said software method in the CORBA stub object calling a software method in a dynamic proxy sending said parameter object;

said software method in the dynamic proxy calling an object request broker (ORB) sending said parameter object;

said ORB creating a copy of said parameter object using a classloader of said called application and returning said copy of the parameter object to said software method in the dynamic proxy; and said software method in the dynamic proxy calling said called software method sending said copy of the parameter object.

4. A computer program product comprising computer program code stored on a computer readable storage medium which, when executed on a data processing system, instructs the data processing system to carry out the method as claimed in claim 3.

5. An apparatus to call a software method of a called application by a caller software method of a caller application, where said caller and called applications are CORBA applications in a process of a computer system, the apparatus comprising:

means for said caller software method calling a software method in a CORBA stub object sending a parameter object, said parameter object being created using a classloader of said caller application;

means for said software method in the CORBA stub object calling a software method in a dynamic proxy sending said parameter object;

means for said software method in the dynamic proxy calling an object request broker (ORB) sending said parameter object;

means for said ORB serializing said parameter object to generate a serialized parameter object and returning said serialized parameter object to said software method in the dynamic proxy;

means for said software method in the dynamic proxy calling the ORB sending said serialized parameter object;

means for said ORB deserializing said serialized parameter object using a classloader of said called application generating a deserialized parameter object and returning said deserialized parameter object to said software method in the dynamic proxy; and     means for said software method in the dynamic proxy calling said called software method sending said deserialized parameter object.

6. An apparatus to call a software method of a called application by a caller software method of a caller application, where said caller and called applications are CORBA applications in a process of a computer system, the apparatus comprising:

means for said caller software method calling a software method in a CORBA stub object sending a parameter object, said parameter object being created using a classloader of said caller application;

means for said software method in the CORBA stub object calling a software method in a dynamic proxy sending said parameter object;

means for said software method in the dynamic proxy calling an object request broker (ORB) sending said parameter object;

means for said ORB creating a copy of said parameter object using a classloader of said called application and returning said copy of the parameter object to said software method in the dynamic proxy; and     means for said software method in the dynamic proxy calling said called software method sending said copy of the parameter object.

* * * * *